United States Patent [19]
Rothenberg

[11] Patent Number: 6,134,529
[45] Date of Patent: *Oct. 17, 2000

[54] SPEECH RECOGNITION APPARATUS AND METHOD FOR LEARNING

[75] Inventor: Martin Rothenberg, Dewitt, N.Y.

[73] Assignee: Syracuse Language Systems, Inc., Syracuse, N.Y.

[*] Notice: This patent is subject to a terminal disclaimer.

[21] Appl. No.: 09/020,899

[22] Filed: Feb. 9, 1998

[51] Int. Cl.⁷ .............................. G10L 15/10; G09B 7/04
[52] U.S. Cl. ........................... 704/270; 704/243; 434/167
[58] Field of Search .................................... 704/270, 276, 704/201, 271, 272, 277, 251, 252, 243; 434/185, 156, 159, 167

[56] References Cited

U.S. PATENT DOCUMENTS

| | | |
|---|---|---|
| 3,713,228 | 1/1973 | Mason et al. . |
| 4,247,995 | 2/1981 | Heinberg . |
| 4,333,152 | 6/1982 | Best . |
| 4,406,626 | 9/1983 | Anderson et al. . |
| 4,569,026 | 2/1986 | Best . |
| 4,681,548 | 7/1987 | Lemelson . |
| 5,197,883 | 3/1993 | Johnston . |
| 5,293,584 | 3/1994 | Brown et al. . |
| 5,302,132 | 4/1994 | Corder . |
| 5,307,442 | 4/1994 | Abe et al. . |
| 5,315,689 | 5/1994 | Kanazawa et al. . |
| 5,340,316 | 8/1994 | Javkin et al. . |
| 5,357,596 | 10/1994 | Takebayashi et al. . |
| 5,387,104 | 2/1995 | Corder ..................................... 434/156 |
| 5,393,236 | 2/1995 | Blackmer et al. . |
| 5,421,731 | 6/1995 | Walker . |
| 5,487,671 | 1/1996 | Shipro et al. ........................... 434/185 |
| 5,503,560 | 4/1996 | Stentiford . |
| 5,524,169 | 6/1996 | Cohen et al. . |
| 5,536,171 | 7/1996 | Javkin et al. . |
| 5,540,589 | 7/1996 | Waters . |
| 5,634,086 | 5/1997 | Rtischev et al. ........................ 704/270 |
| 5,717,828 | 2/1998 | Rothenberg .............................. 704/270 |

FOREIGN PATENT DOCUMENTS

| | | |
|---|---|---|
| 0360909 | 4/1990 | European Pat. Off. . |
| WO 97/294482 | 8/1997 | WIPO . |
| WO 98/02862 | 1/1998 | WIPO . |

OTHER PUBLICATIONS

International Search Report for PCT/US99/02782, mailed Jun. 10, 1999.
written Opinion for PCT/US99/02782, mailed Jan. 12, 2000.

*Primary Examiner*—David R. Hudspeth
*Assistant Examiner*—Harold Zintel
*Attorney, Agent, or Firm*—Fulbright & Jaworski L.L.P.

[57] ABSTRACT

The invention extends the capability of conventional computer speech recognition programs to reliably recognize and understand large word and phrase vocabularies for teaching written language skills. At each step of a teaching program, information is supplied to the user such that some responses in the language being taught are correct (or appropriate) and some are incorrect (or inappropriate), with these respective sets of responses judiciously selected to teach some language aspect (i.e., vocabulary, sentence structure). A subset of allowable correct; and incorrect responses is selected such that a speech recognition subprogram readily discerns certain allowable responses from other allowable responses, including each incorrect response being discriminable from each correct response. The meanings of at least the correct allowable responses are made clear by aural or visual information, such as graphic images, printed text, or translations into the user's native language. The invention may be used for the effective teaching of reading skills. This method pertains to children learning to read in their native language, as well as to adults that have learned only the spoken form. The method encourages a user into pronouncing the words and phrases being used, the letter-sound relations will be reinforced much more strongly than if the student's response is just a mouse click indicating correct comprehension.

17 Claims, 4 Drawing Sheets

SPEECH RECOGNITION APPARATUS AND METHOD FOR LEARNING

BACKGROUND OF THE INVENTION

1. Field of the Invention

This invention relates to a speech recognition apparatus and method. More precisely, this invention relates to a speech recognition apparatus and method useful for learning language skills.

2. Description of the Related Technology

Modern multimedia computers can be an effective tool for learning new language skills. Still and animated visual images, text, and audio can be interwoven in interactive programs. The audio may include both computer-generated (synthesized) speech or large amounts of high quality natural speech, prerecorded and stored efficiently in digital form, and accessed as required for the interactive learning program. The weak link, however, is the ability of a computer to accept and act differentially in response to the speech of a learner in an interactive language learning application.

Even the most powerful computer is still unable to analyze the meaning, syntax, and pronunciation of a user's unrestricted continuous speech in near-real time, as does the human auditory system. Compared to the human capability, the abilities of the best computers (even without the real-time restriction needed for interactive situations) are extremely rudimentary. Various articles have been written that describe the inadequacy of various speech recognition systems, including Richard D. Peacocke & Daryl H. Graf, An Introduction to Speech and Speaker Recognition, COMPUTER Magazine, August. 1990, at 26–34; David B. Roe & Jay G. Wilpon, Whither Speech Recognition: The Next 25 Years, IEEE Communications Magazine, November 1993, at 54–62; Alexander I. Rudnicky, et al., Survey of Current Speech Technology, Communications of the ACN, March 1994, at 52–56.

However, there are many computer-based systems for accepting and acting differentially in response to human speech that emulate enough of the human capability to be useful in specific applications. Among these are "speech understanding" systems which are directed towards identification of the intended meaning or semantic content of an input segment of speech. Speech understanding systems may be useful, for example, in task-oriented human-computer interactions in which it is not important to identify the actual words spoken or obtain an analysis of the syntax or pronunciation of the speech. See U.S. Pat. No. 5,357,596 and Hirohjuki Tsuboi, et al., Real-Time Task-Oriented Speech Understanding System Using Keyword Spotting, IEEE Transactions on Acoustical Speech and Signal Processing, September 1992, at 197–200.

There are other applications, such as automated dictation or voice data entry, for which it is important for a computer to identify the actual words spoken. Systems accepting speech input that emphasize the correct identification of particular words or sequences of words are commonly referred to as "speech recognition" systems, or "word recognition" systems if the speech input segments are limited to single words or short phrases. (Unfortunately, the term "speech recognition" is also used loosely as a descriptive label for the totality of systems accepting and selectively acting in response to speech input.) For example, in a system for automated dictation for English, it is of primary importance to obtain the correct orthographic representation of a spoken word, and meaning is secondary. If the spoken sentence is "He's a bear of a man," or "He will bear the burden," the semantic content of "bear" is only important to the extent that it is not transcribed "bare." In "He tore across the room," the word "tore", to a speech understanding system, must be unambiguously understood as "moved quickly," whereas to a speech recognition system for dictation it is merely the word that happens to be the past tense of "tear."

A third type of system accepting and selectively responding to a speech input can be termed a "speech analysis" system. Speech analysis systems are used in applications in which properly and improperly formed or pronounced speech must be differentiated, whereas speech recognition and speech understanding systems are primarily directed, respectively, to determining the intended linguistic segments or the intended semantic content relative to a specific context or task to be performed.

To be maximally useful for language instruction, a system for interactive human-computer speech communication must be able to exhibit all three of these capabilities of a human tutor familiar with the language: understanding, segment recognition, and speech pattern analysis. To accomplish this, there would have to be either a very significant improvement in the capabilities of present speech input technology or the devising of a system for human-computer speech interaction in which a speech input technology that is constructed according to the present state-of-the-art can be used. This invention is directed toward the latter approach.

Among the attempts to create a restricted emulation of this human speech recognition capability, there is presently a technology available for speech input to a computer that is constructed so as to automatically determine which of a pre-specified, finite number of speech segments was spoken. A software package, or a combination of software and hardware, designed to accomplish this task can be referred to as a discrete speech recognition engine ("DSRE"). This type of system has been applied to purposes such as voice data entry and providing voice control over some of the functions of a computer or voice control over the functions of a system operated under the control of a computer. In another application, a DSRE with a large vocabulary can be used for dictation, if the words are spoken separately with a short pause after each word. This capability is often referred to as discrete speech recognition.

A DSRE contains a computer program that accepts a sample digitized speech waveform X, and compares it to a preset number N of waveforms, information about which is stored in computer memory. The DSRE computer program may calculate a number, or set of numbers, that reflects the similarity of the sample waveform X to each of the N internally stored waveforms according to an analysis scheme used by the computer program. This calculated number is often referred to as a distance measure. The "distances" between the sample waveform X and each of the N internal waveforms may then be represented by an array [X, Ai], where i varies from one to N. The computer program can produce all of the distance measures between the sample waveform and the internal waveforms and determine the internal waveform yielding the best match (having the smallest distance measure) to the sample waveform X, or determine that no internal sample was a good enough match, according to criteria set by the computer program or the user.

Internal waveforms can be formed so as to enable a DSRE to accept a wide range of voices as matching, thus making the matching process speaker-independent to a greater or lesser degree. Conversely, a DSRE that derives its internal waveforms only from examples of the voice of the user is well suited primarily to that one person and may be highly speaker-dependent. In practice, however, there is no clear line between speaker-dependent and speaker-independent, because a DSRE designed to be speaker-dependent may work well with other speakers having speech characteristics similar to those of the intended user, and a DSRE designed to be speaker-independent may often require optimization for individual speakers having voices or speech characteristics far from the expected norm (such as young children, speakers having a strong regional or cultural dialect or foreign accent, or speakers having a partially dysfunctional voice as a result of illness).

There are a number of modifications of the basic scheme for discrete speech recognition that are intended to increase its scope or capabilities. In an adaptive DSRE, the performance of a speaker-independent system is optimized by having the system automatically incorporate information about the user's speech characteristics while the system is being used. Such a system is described in Paul Bamberg, el, al., Phoneme-Based Training for Large-Vocabulary Recognition in Six European Languages, Proc. of the Second Eur. Conf. on Speech Comm. and Tech. (Geneva), September 1991, at 175–81. An adaptive system can be 'broadly adaptive' if it only identifies and adapts to a large class of speakers to which the speaker belongs (male vs. female; American English speaker vs. British English speaker) or 'narrowly adaptive' if it adapts to the detailed speech characteristics of the speaker.

In another modification of the basic scheme, to reduce the number of internal models that must be stored in the computer as the vocabulary is increased, models for reoccurring parts of a word, such as the phonemes (letter-sounds, to a first approximation) or short phoneme sequences, are stored, and complete words or phrase models are constructed from these segment models. There is generally a resulting decrease in recognition accuracy which may be acceptable in some applications. Paul Bamberg, et al., Phoneme-Based Training for Large-Vocabulary Recognition in Six European Languages, Proc. of the Second Eur. Conf. on Speech Comm. and Tech. (Geneva), September 1991, at 175–81; Kai-Fu Lee, Context-Dependent Phonetic Hidden Markov Models for Speaker-Independent Continuous Speech Recognition, IEEE Transactions on Acoustical Speech and Signal Processing, April 1990, at 599–609. Some commercial DSREs include both whole-word/phrase models and constructed models. See U.S. Pat. No. 5,315,689.

In yet another modification, often referred to as 'word-spotting', the DSRE is designed to correctly match an input speech waveform segment to an appropriate internally-stored pattern even when the input waveform segment is embedded in a longer segment of continuous speech. Jay G. Wilpon, et al, Automatic Recognition of Keywords in Unconstrained Speech Using Hidden Markov Models, IEEE Transactions on Acoustical Speech and Signal Processing, November 1990, at 1870–78; Hirohjuki Tsuboi, et al., A Real-Time Task-Oriented Speech Understanding System Using Keyword Spotting, IEEE Transactions on Acoustical Speech and Signal Processing, September 1992, at 197–200.

In describing this invention, the term "discrete speech recognition engine" or "DSRE" shall be identified with the basic whole-word/phrase implementation, although other modifications such as the above could be employed as the technology improves.

A DSRE for which a user can specify some or all of the lexical items (speech segments) which the DSRE must differentiate should also be able to compute $(N^2-N)$ distance measures between the N internal models corresponding to these lexical items: {[A1, A2], [A1, A3], . . . , [A2, A3], [A2, A4], . . . , [AN−1, AN]} since this set of internal distance measures can be used to determine whether the internal waveforms are separated sufficiently by the DSRE analysis scheme. For example, in using a DSRE for control purposes, the user might desire the English commands "go" and "no" as lexical items. However, the analysis scheme used may not distinguish adequately between the internal samples representing these two speech segments; that is, the distance measure [A(go), A(no)] might be very small. The user could then substitute alternate terms with a roughly equivalent meaning, such as "start" or "proceed" for "go" or "negative" for "no."

In the applications mentioned above, there is at any one time a specified set of allowable utterances which the DSRE is required to differentiate. However, this set of allowable utterances can be made changeable by the computer system in which the DSRE is embedded. For example, at one time the specified set might be based on the voice and selections of a first user while at another time it might be based on a second user. Unlike the system disclosed below, however, in such previous systems it is the case that, given the set active at any specific time, the speaker can choose any utterance from the set, with all such utterances equally valid.

When used for language learning, a conventional DSRE has a number of significant restrictions:

(1) The DSRE can only respond to a predetermined set of isolated words, phrases, or sentences. The computer program considers a sample phrase or sentence as a complete "word," and the program does not analyze linguistically the sample waveform X into component meanings.

(2) The vocabulary, though often programmable by the user to some extent, must be very limited in size to obtain good performance in a speaker-independent application. For example, a vocabulary of 100 words can strain the capabilities of the typical DSRE designed for a personal computer, however, a total vocabulary of that size would be restrictive for language instruction, especially if each complete phrase or sentence to be recognized must be considered a separate "word."

(3) To minimize errors and unrecognized speech segments, speaker-independent DSREs require the speakers to already know the language well enough to produce a voice pattern that matches the voices used to create the internal samples of the computer program. Thus, if a student first learning a new language used a conventional DSRE in a manner consistent with the present state-of-the-art, the computer program would often be unable to properly recognize the students' sample speech waveforms. This inability cannot be readily cured by the use of a speaker-dependent DSRE trained using the unselected speech patterns of the individual student or by the use of a narrowly adaptive DSRE, as defined above. Though strong speaker-dependence would reduce identification errors and unrecognized speech segments, it would not be pedagogically effective, since it would tend to build the mistakes of the student into the teaching program.

(4) To achieve near-real-time performance, it is necessary for a DSRE to ignore many aspects of the input speech waveform that would normally be considered important to good pronunciation. For example, variations in voice pitch are usually largely ignored in DSREs designed for the recognition of spoken English, because these variations are not very important in signaling differences in word meaning for the English language. (This is not true for Mandarin Chinese and certain other languages.) Also, such programs tend to differentiate poorly between certain close-sounding consonants or vowels and, in order to make the DSRE less sensitive to the rate-of-speech, current analysis schemes ignore many durational features of the individual sounds or words, even though such features may be important to the phonology (pronunciation patterns) of the language.

A problem considered by the present apparatus and method is that of employing a DSRE having some or all of the above limitations as a component in an interactive system for teaching or improving oral language skills. In particular, this application presents an apparatus and method for using a DSRE having such limitations to perform speech segment recognition, speech understanding, and speech analysis functions useful for the improvement of oral language skills.

SUMMARY OF THE INVENTION

With randomly accessed, good quality audio and video production (including still and animated graphics), a personal computer (or a remotely accessed file server of a larger computer) becomes a potentially powerful tool for language learning (written or oral). However, to effectively teach or improve oral production skills, a computer system must be able to emulate the essential speech reception skills of a human listener skilled in the language. Optimally, a computer-based system used for language learning must exhibit the following properties:

(1) Recognition. The system should consistently recognize or identify the word or words spoken by the learner, even when given a marginally accurate production, just as a parent understands a child when it is learning it's first language.

(2) Understanding. The system must reliably decipher the intended meaning of the words, phrases, or sentences that are recognized.

(3) Speech analysis. Optimally, the system should also be able to meaningfully discriminate between properly formed and deficient productions.

(4) Correction. The system should also provide meaningful correction for certain types of deficient production.

All four elements are desirable in an effective interactive learning program. The recognition and understanding functions serve the important role of encouraging further production by enabling the learner to interact orally when reading the written form of the new language. However, recognition and understanding alone do not necessarily shape correct oral language skills. In fact, a computer with better recognition and understanding capabilities can be a poorer teacher of proper production skills, because poor production will more often be rewarded by understanding. In practice, an error in recognition or understanding is desirable in the case of a strongly deficient production, since these non-matches should lead a student to suspect a need for speech production improvement.

In the proposed system, consistent recognition is accomplished by, at each step of the learning program, defining and limiting the recognition decision to certain allowable responses that form a subset of a total vocabulary of words and phrases and are mutually discriminable by the DSRE used to the extent required by the pedagogical objectives of the learning program.

At each step of the learning program in the proposed system, a correct recognition decision is linked to a correct meaning by making available to the learner by auditory or visual means both the proper pronunciation of each of the allowable responses and the meaning of at least the correct or appropriate allowable responses. It will usually be advantageous to also make available to the user the meaning of incorrect or inappropriate allowed responses. However, this may not always be the case. For example, some learning programs may use allowable responses that are incorrectly formed, and thus have no clear meaning.

In the proposed system, discrimination between properly formed and pronounced and deficient productions may be improved by including in the total vocabulary certain dummy responses that represent misformed or mispronounced versions of certain properly formed and pronounced responses in the subset. These dummy responses could be used to augment the subset of allowable responses for the purposes of discrimination by the DSRE, but might not be presented to the user as responses alternatives.

In the proposed system, corrective feedback may be accomplished by requiring a better production for an overt recognition decision by the system, even when the intended speech segment of the production is potentially identifiable within the subset of allowable responses by the DSRE used, or by using more complex schemes of auditory or visual feedback to the user as to the proper pronunciation, syntax, etc.

Accordingly, it is an object of this invention to provide an apparatus and method for extending the capability of a computer speech recognition program to reliably recognize, understand, and analyze a large vocabulary of words and phrases for the purposes of teaching the comprehension and oral production of those words and phrases. It is another object of the invention to add substantial speech correction capability to such a program. It is a more specific object of this invention to provide a method for employing a computer subprogram that matches the oral response of a learner to patterns corresponding to a set of prespecified speech segments in order to teach oral language skills. In this method, the computer may supply information to the learner such that some of the allowable responses are correct and some are incorrect, with the sets of correct and of incorrect responses judiciously selected to teach some aspect of the new language.

In addition it is another object of the invention to use computers with speech recognition apparatus for teaching reading skills. Guiding a user to pronounce words and phrases into a speech recognition device reinforces letter-sound relations much more strongly than if a student's response is just a mouse click indicating correct comprehension.

DETAILED DESCRIPTION OF THE PREFERRED EMBODIMENT

Figure 1:
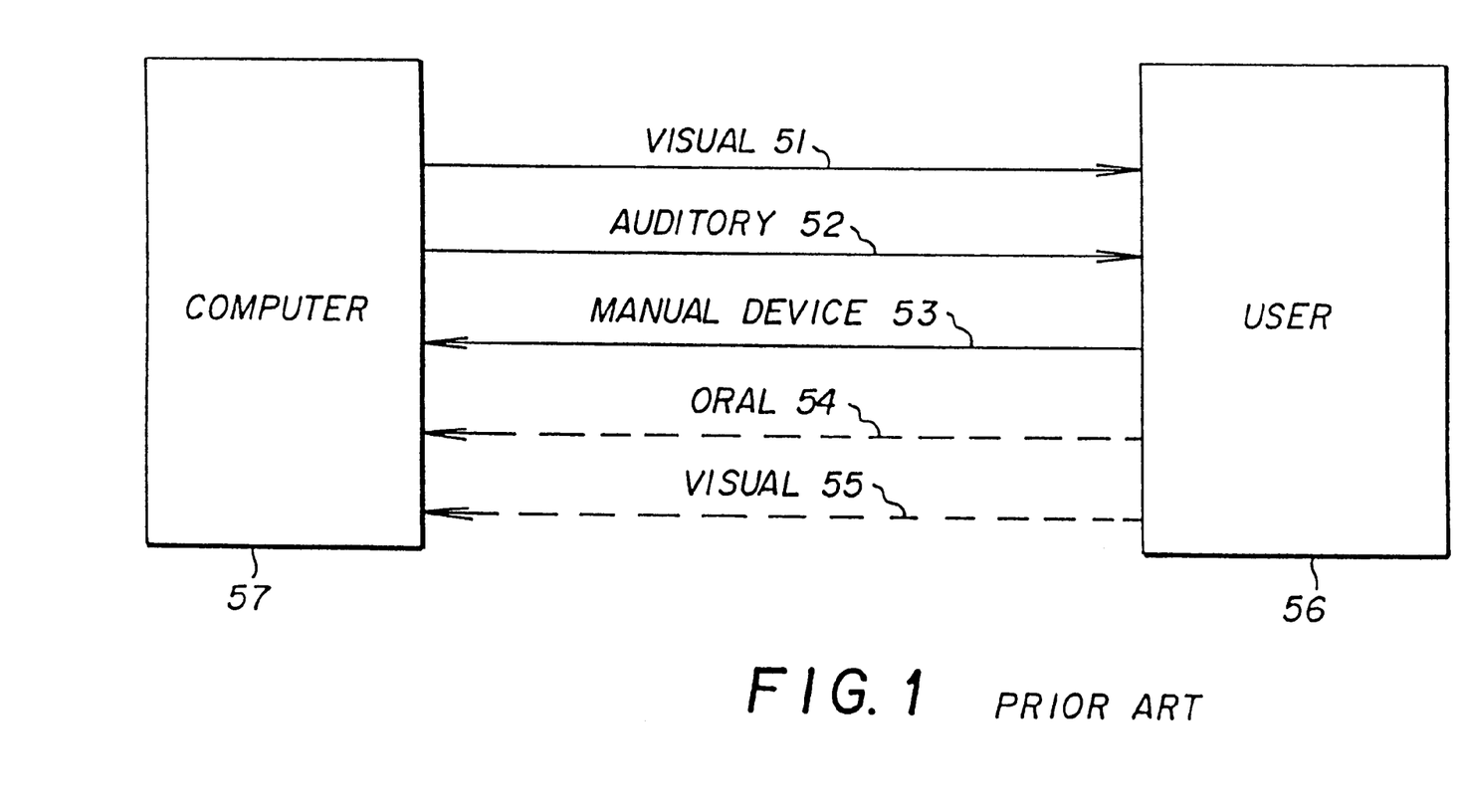
FIG. 1 is a diagram of prior art interactions between a computer and a user.

As the solid arrows in prior art FIG. 1 indicate, schemes for language instruction include a computer 57 which communicates to a user 56 by either visual 51 or auditory 52 means, while the user 56 normally responds to the computer using a manual device 53, such as a keyboard, computer mouse, trackball, joystick, or touch screen. Using these communication modalities, interactive activities such as games, stories, or practice drills can be devised to teach or improve comprehension skills in the aural (listening) and visual (reading) modalities and improve orthographic production skills in the manual (writing or typing) modality.

For the improvement of oral production skills (speaking), however, the user 56 must be able to talk to the computer 57 in a meaningful way, as indicated by the dashed arrow oral link 54 in FIG. 1. FIG. 1 also includes an electronic visual link 55 from the user 56 to the computer 57 that would be appropriate if the language production skills to be learned were for a manual (sign) language. Before this apparatus and method was created, oral input to a computer for the purpose of language learning has been essentially limited to a record-playback function. This record-playback function mimics the operation of a tape recorder, except that the random-access memory of a computer facilitates playing back voice productions in close temporal proximity to productions of the same material pre-recorded in the computer's memory. Thus, students can easily compare their own pronunciation with the "computer's," but students must still rely on their own subjective perception of how close their pronunciation is to the model. Additionally, a record-playback function alone does not permit the interactive interplay between the student and the computer, because the computer system does not react differentially to the linguistic or semantic content of the user's voice input.

A. Implementing Understanding with a Conventional DSRE

Figure 2:
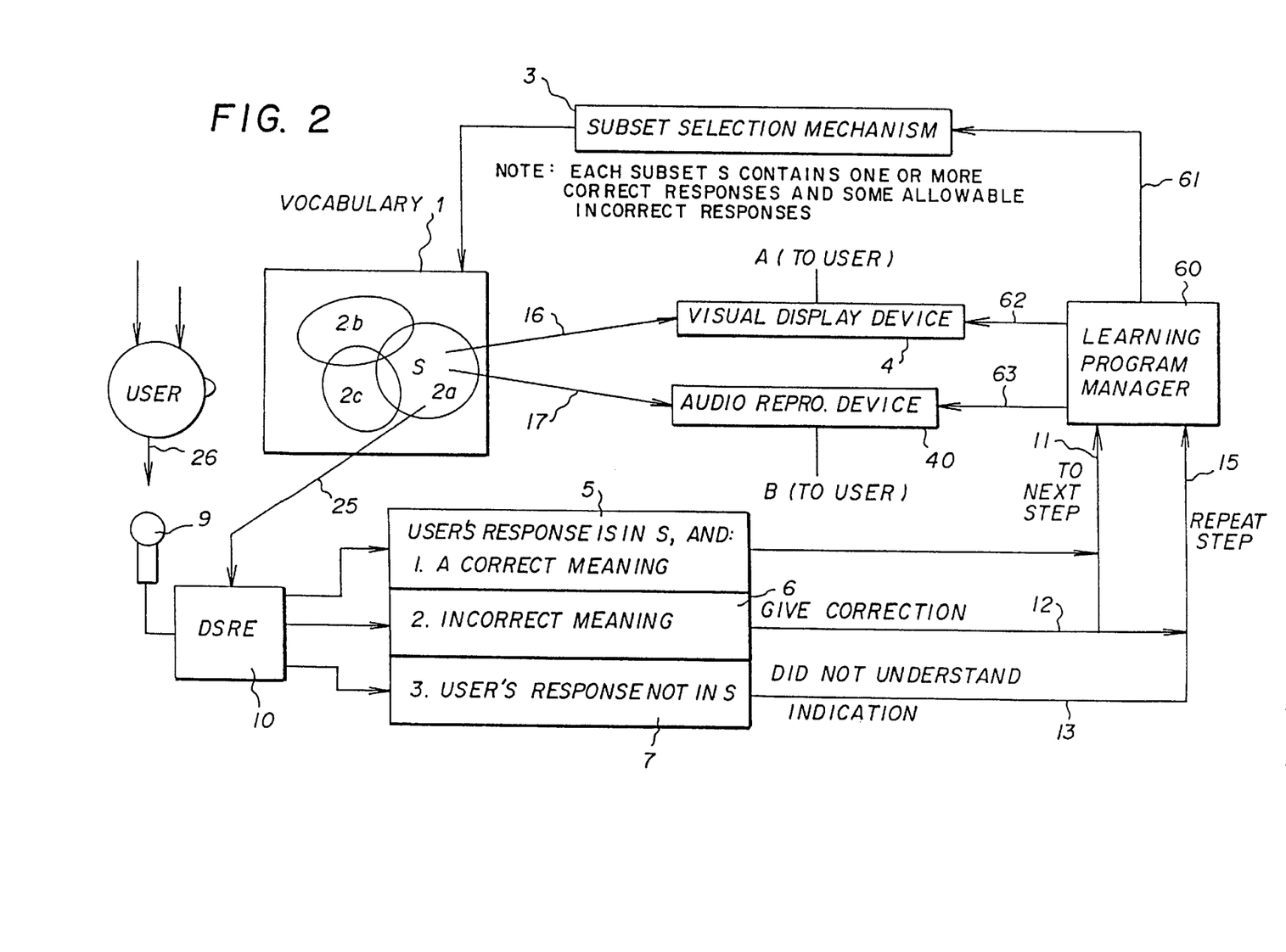
FIG. 2 is a diagram of a preferred embodiment of a speech recognition method.

FIG. 2 illustrates a preferred embodiment of the speech recognition method for learning that uses a conventional DSRE computer subprogram 10. The full vocabulary 1 of words, phrases, or sentences to be taught is partitioned into a multitude of possibly overlapping subsets, exemplified by 2a, 2b, and 2c. Each subset 2a, 2b, 2c contains vocabulary items distributed in number and pronunciation such that at least some of the individual words, phrases, or sentences in the subset are readily differentiable from others in the subset by the DSRE 10 used.

At each step in the learning program, a learning program manager 60, which can be a computer program, provides auditory or visual information to the user that defines at least one correct or appropriate oral user response, including at least one such correct or appropriate response that is in at least one of the subsets, and at least one incorrect or inappropriate oral response that is in the same subset and readily differentiable from at least one of the correct responses in the subset. This defining information, which may be, for example, in the form of a question, game, puzzle, exercise drill, or simulated conversation, is presented by means of a visual display device 4, which can be a computer monitor, by path 62, or an audio reproduction device 40, which can be an amplifier and loudspeaker or headphones, by path 63.

Further, at each step in the instructional program for which an oral response is required from a user 26, a subset selection mechanism 3, controlled by learning program manager 60 (path 61), chooses one of the subsets, exemplified by 2a, that contains at least one correct or appropriate oral response and certain other incorrect or inappropriate responses. This subset is said to contain the allowable responses for that program step.

The DSRE 10 then receives, as an input 25, an identification of the current subset S (currently subset 2a in FIG. 2) of allowable responses and places each oral response from the user 26, as obtained by a transducer such as microphone 9, into one of at least three categories according to the DSRE's evaluation of the student's response:

1. judged to match a response in the chosen subset with a correct meaning, path 5, wherein the computer goes to the next step of the language learning program, path 11, as controlled by learning program manager 60;

2. judged to match a response in the chosen subset with an incorrect meaning, path 6, wherein the computer can give a correction, path 12, which can either identify for the user the reason that the response was incorrect or inappropriate or merely identify the response as incorrect, and either go to the next step of the language learning program, path 11, or repeat the same step, path 15, as determined by the learning program manager 60; or 3. judged to not match any response in the chosen subset, path 7, wherein the computer can notify the student that it did not understand the student's response, path 13, repeat the program step, path 15, and allow the student to present a new response as controlled by learning program manager 60.

To improve performance, the responses in the chosen subset S can be selected so that the allowable correct responses are each separated from each allowable incorrect response by a large distance measure. Thus, in this preferred embodiment, the paradigm under which the DSRE is used is formed such that the allowable incorrect responses are a relatively small set, each member having a high distance measure from each allowable correct response, though not necessarily from the other incorrect responses.

For example, when asking "Which item [on the screen] is a fruit?" (when teaching English), a pear might be presented on the screen along with a glass of milk and a chicken, rather than a glass of milk and a bear because "pear" and "bear" are phonetically similar. If the learning paradigm, as embodied in the program manager 60, does not require differentiation between the incorrect responses (as when the correction is "No, that is not correct."), for a correct response of "the apple", incorrect responses could be "the beer" and "the bear". Although a typical DSRE may calculate a small distance measure between these incorrect responses, both incorrect responses would be readily differentiable from the correct response. However, if the learning paradigm requires a knowledge of which incorrect response was chosen, (as when the correction is "No, that is a xxxx."), then the distance measure between the incorrect responses must also be large. Thus under such a paradigm, if the correct response is "the apple," the alternate incorrect responses "the bear" and "the beer" should not be presented simultaneously.

Likewise, if the learning paradigm does not require a knowledge of which, of more than one, correct answer is produced by the user (as when there are two pieces of fruit on the screen and either "apple" or "pear" would be correct, and the computer's response to a correct choice is "Yes, that's a fruit."), then the distance measures between the correct responses need not be large. But if the computer's response depends on which correct response is spoken, the distance measures between the correct responses must also be large. (For example, when either "a pear" or "an apple" is correct and the computer's response is "Yes, that's a pear." or "Yes, that an apple".)

In a language learning situation, it is important that meanings of at least the correct allowable responses be made available to the student, so that the student can restrict his intended response to the meanings of the responses within the set. Thus, to use the example above, it is important that the student does not intend to say "bear" when the correct response is "pear" and allowable incorrect responses are only "chicken" and "milk", since the word "bear" is likely to be accepted by the DSRE as a correct response "pear". Thus, a preferred embodiment of this invention includes means for providing visual and/or auditory information that makes clear the meanings of at least the correct responses that are included in chosen subset S. This information can be either given automatically or at the optional request of the student. In a preferred method, a representation of the contents of S (currently subset 2a in FIG. 2) is transmitted through path 16 to the visual display device 4 or through path 17 to the audio reproduction device 40.

In a preferred embodiment, providing to the user the available or allowable responses also includes some form of modeling of the proper pronunciation of the allowable responses. This can be, in part, pronunciation examples as aural modeling provided through audio reproduction path 17 and can include visual displays, such as phonetic spelling, explanatory graphic displays, or images of a speaker's mouth which make the correct pronunciation clearer. The aural modeling can have at least two forms: exhaustive or selective.

In exhaustive modeling, all response alternatives are presented aurally, usually in the context of the question or request: "In Japan, what do most people drink—milk, tea, or coffee?" or "Do you want to turn to the left, or to the right?" The response alternatives are underlined.

In selective modeling, the response alternatives can be presented graphically or iconically on the screen. The question or request may or may not include the alternatives. For example, the following questions do not contain the response alternatives: "In Japan what do most people drink?" or "Which way do you want to turn?" The student can then hear prerecorded examples of proper pronunciations of any of the alternatives by a selection procedure. This selection procedure may consist of clicking with a mouse on the appropriate icon. For example, for the first question, the student could select a picture of a glass of milk, tea, or coffee. Or, in the second question, the student could select a diagram of arrows going to the right or to the left. An alternate selection procedure could consist of an appropriate request phrase that is readily discriminable by the DSRE. For example, the milk, tea and coffee can be labeled with the numerals 1, 2, and 3, and the selection procedure consist of the student speaking the appropriate number in either the target language or the student's native language.

Exhaustive and selective modeling can be combined, and it should be possible for the user to hear an aural model repeated. Because it does not stress the user's auditory memory greatly, exhaustive modeling allows a larger set of alternatives to be used than does selective modeling. Thus, exhaustive modeling with a small set of alternatives could be used for beginners or for younger children, with selective modeling used more with older, more advanced students.

According to this method, the mechanism for subset selection 3 can be programmed so that at each language learning program step, there is a specific static subset prepared for each question asked by the computer, or the subset selection mechanism 3 can be such that the computer program dynamically selects one or more of the items to be in the subset 2a according to some probabilistic rule. Thus, during a dynamic selection, alternative incorrect responses for a correct response of "pear" could be chosen randomly from all internal waveforms of full vocabulary 1 for which the respective distance measures from the word "pear" are adequately large.

It is also envisioned that there will be some learning program steps under this method for which there will be no clearly incorrect or inappropriate responses, but rather at least two appropriate allowable responses which must be differentiated. An example of this type of interactive language learning activity is a maze, which must be traversed under oral directions in the target language (such as "go left", "go right", "go forward", "turn around", etc.).

B. Implementing Correction with a Conventional DSRE

There is a certain amount of oral language correction inherent in an "understanding" paradigm, especially when the criterion level for acceptance is made high. This type of correction is especially strong for syntactic errors (as differentiated from phonological errors). Thus, a user who says "the house red" instead of "the red house" might receive a response of "I did not understand" from the computer and be invited to try again after reviewing aural models of the correctly spoken response alternatives.

Phonological errors and more subtle syntactic errors (such as a wrong article in English, or singular-plural mixing), however, will generally require more specific, targeted correction methods. In devising such methods, one must consider the severe constraints imposed by a specific DSRE, which attends to only a limited number of parameters of a speech signal. Even within the DSRE's parameters, the DSRE may average or blur distinctions in order to achieve recognition accuracy over a broad range of voice types and speaking styles.

Figure 3:
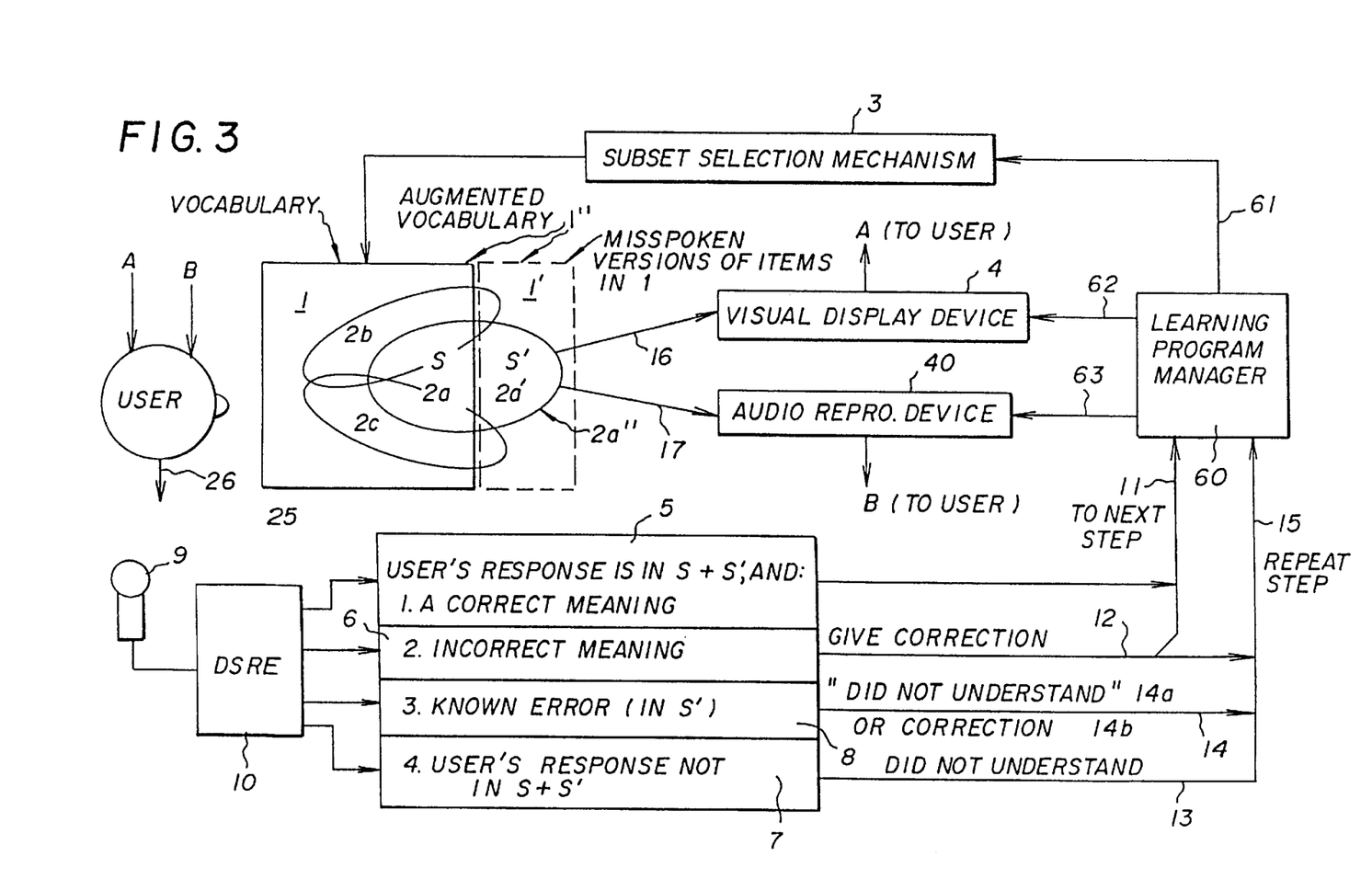
FIG. 3 is a diagram of a preferred embodiment of a speech recognition method with dummy responses.

In a preferred embodiment, shown in FIG. 3, the analysis limitations of a conventional DSRE are ameliorated by the specific nature of the pedagogical requirements for language instruction, namely, that the primary grammatical and phonological problems of learners having a specific native language background tend to be from a rather small set that is known to experienced language teachers familiar with the characteristics of the native language and the target language. For example, Japanese or Chinese speakers, when learning English, typically have difficulty with articles and singular-plural differences and substitutions between "l" and "r" sounds. English speakers, when learning a tone language such as Mandarin Chinese, have difficulty with word intonation patterns.

The preferred embodiment of FIG. 3 accounts for these specific pedagogical requirements by including in the speech recognition apparatus and method-for-learning dummy internal waveforms in the following manner:

(1) Specific language problems are determined that are both relevant to the language background of the user and discriminable by the DSRE used. The term "discriminable" here implies that the DSRE is capable of providing a sufficiently large distance measure between the proper production and typically misspoken productions. The misspoken productions may or may not have their own meaning in the language and may or may not be presented to the user as response alternatives by path 62 or 63.

(2) Misspoken productions are added as a set of separate internal waveforms 1' to the full vocabulary 1, to produce augmented vocabulary 1". The subset selection mechanism 3 would then select a subset 2a" of the augmented vocabulary 1" that contains both a subset of proper productions 2a and a subset of misspoken productions: 2a'. The DSRE would be trained to recognize misspoken productions just as it recognizes proper productions.

(3) When a student's response, as obtained by a transducer such as microphone 9, is judged to by the DSRE 10 to match a "dummy" internal waveform from misspoken subset 2a', path 8, the language learning program would treat the student's response either simply as an unrecognized response ("I did not understand your response") 14a or as a correction, that is, an incorrect response of a particular type ("You have said walk instead of walks.") 14b, depending on the pedagogical objective.

These dummy categories would have the effect of sharpening the discrimination of the DSRE along specific dimensions that are important to the learning situation. Thus, this speech recognition method makes optimal use of the discrimination capacity of any particular DSRE. With the increasing sophistication of real-time DSREs, the range of possible corrections will increase accordingly.

C. Augmenting DSRE Discrimination Capability

Figure 4:
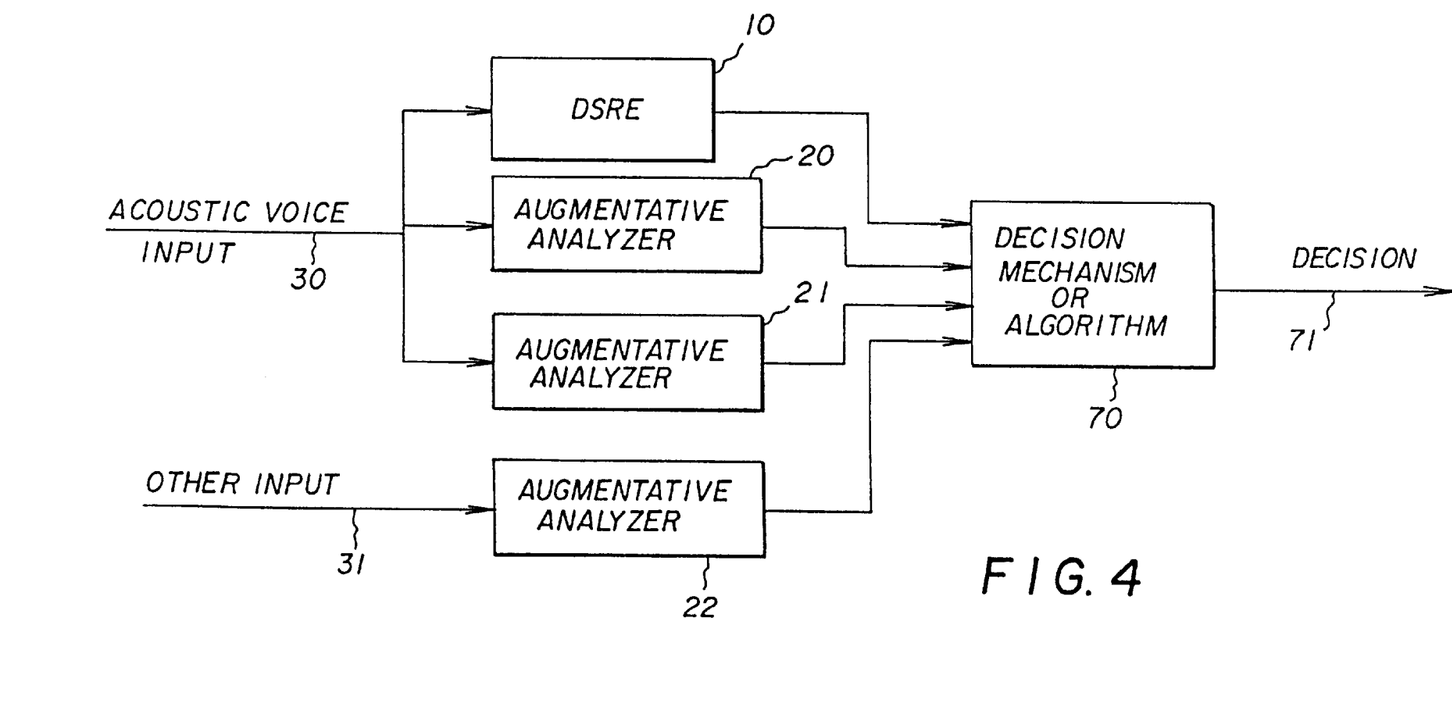
FIG. 4 is a diagram of a preferred embodiment of a speech recognition apparatus.

As shown in FIG. 4, when aspects or parameters of speech in the target language are not discriminable by a conventional DSRE, the language learning program decision mechanism or algorithm 70 of this invention can include separate, parallel augmentative analysis schemes for those aspects or parameters, the output of which are advantageously combined with the output of the DSRE for the purpose of making the recognition decision 71.

A DSRE is most advantageously constructed so as to efficiently extract and analyze the features of the speech signal that carry the most linguistic information in the language or languages of interest. This is especially true if the DSRE is to be used for real-time analysis, as is necessary for the interactive applications described above As a particular example, a DSRE optimally designed for the real-time analysis of English words and phrases may not analyze the intonation patten of the voice speech input, nor other aspects of sentence stress, such as voice intensity, overall spectral quality (relative strength of higher frequency harmonics), and relative segment duration, because these elements are not very important in differentiating English words and short phrases. Intonation, however, is an important feature for differentiating between words in some Asian languages, such as Mandarin Chinese.

Also, if the DSRE is to operate in a speaker-independent mode, the details of the vowel quality used by the speaker cannot be made a significant factor in the recognition decision, since these details can vary greatly between speakers of the language and depend on factors such as dialect, age, health, and emotional state. For example, the presence or absence of a nasal quality to the vowels can be affected by all these factors, but nasal quality would not be linguistically significant in English, while it is important in French. Therefore, if a DSRE of this type is used for language training, and especially if the language to be taught is not the language for which the DSRE was designed for, it can be advantageous to include other voice analysis mechanisms which operate in parallel with the DSRE, and the output of which are conjoined with the output of the DSRE, in order to make a final recognition decision. This arrangement is illustrated in FIG. 4, with three augmentative analyzers 20, 21, 22 shown.

Parallel augmentative analyzers 20, 21 such as intonation analyzers and voice spectral quality analyzers can operate either from the same acoustic voice input 30 as the DSRE 10, or parallel augmentative analyzer 22 can operate from another input 31. Such other inputs could include an electroglottograph or throat microphone, both of which can be used to accurately measure intonation, a nasal vibration or airflow monitor to monitor nasality, or an oral airflow monitor which measures the degree of aspiration of, and aids in differentiating between, plosive consonants such as "b" or "p".

Parallel augmentative analyzers also can be enabled selectively by the computer program, depending on the target language and target language features and the level of production accuracy required by the program.

D. Combining Language Instruction with the Development of other Cognitive and Reasoning Skills The method described above teaches oral language skills by inducing a dialogue between the computer and the student involving the language skill to be learned or improved. This dialogue can be advantageously constructed so as to develop other cognitive or reasoning skills as the subject matter of the language exchange. For example, a dialogue about locations and directions could be constructed so as to also teach geography and map-reading skills. A game involving the computation of arithmetic sums could be used to teach mathematical skills in addition to teaching the associated language. Other more complex games or activities can be devised which add memory, cognitive or other skill challenges.

In addition to introducing the dialogue between the computer and the student, the apparatus may be used for the effective teaching of reading skills. The speech recognition apparatus may aid students who have learned only the spoken form of a language by encouraging a user to pronounce the words and phrases being used while viewing the letters, words or phrases. In this way, letter-sound relations will be reinforced much more strongly than if the student's response is just a mouse click indicating correct comprehension. This method can also utilize pictorial representations of the phonetic images, letters, words or phrases to aid in the teaching process. In addition, the vocabulary definition may be presented to aid the learning process.

For an example that illustrates the paradigm difference the when speech recognition apparatus is used, consider a computer screen with the words "bat" and "cat" and also pictures of a bat and a cat. Without the speech recognition apparatus, the student can be asked to use the mouse to match each picture with the corresponding word. With this method, the student can be shown two boxes with the words "bat" and "cat" printed respectively on the boxes. Assume that one of the boxes, the box containing the word "cat" is also highlighted or indicated by a human or animal figure. A voice can ask "Does this box contain the bat or the cat?" A correct spoken response can show the cat emerging from the box with a reinforcing aural comment. An incorrect spoken response can be followed by, "No, bat begins with a "b" sound or a visual representation of a "b" could appear on the screen, Try again. Does this box contain a bat or a cat?"

Combining language learning with other cognitive or reasoning challenges is generally considered advantageous in language instruction pedagogy, in that the language is treated as a communication tool and not just a skill to be learned for its own sake. Thus, the expansion of the method described herein to combine language instruction with the teaching of other skills should be considered within the scope of this disclosure.

What is claimed is:

1. A method for using a computer to teach language reading skills comprising:

selecting a subset of stored internal speech patterns containing at least one correct internal speech pattern which corresponds to a correct response and at least one internal speech pattern corresponding to an incorrect response, from a set of stored internal speech patterns, using a computer program, wherein said correct internal speech pattern is readily differentiable from each of said internal speech patterns corresponding to an incorrect response by a comparison subprogram;

presenting a visual image to a user that corresponds to said correct internal speech pattern, obtaining a speech response segment from the user;

comparing, using the comparison subprogram, said speech response segment to the subset of stored internal speech patterns and determining the degree of matching to each internal speech pattern in the subset of internal speech patterns; and presenting to the user a response to the speech segment based on the results of the step of comparing.

2. The method of claim 1 wherein the subset of stored internal speech patterns includes at least one internal speech pattern corresponding to an improperly formed or pronounced response which is a variation of said correct response.

3. The method of claim 2 wherein the step of directing further comprises directing the user toward a more properly formed or pronounced speech response if the speech response segment most closely matches the improperly formed or pronounced response.

4. The method of claim 1 wherein said subset of internal speech patterns includes at least one improperly pronounced variation of a response represents a speech response segment indicative of the user's native speech pattern.

5. The method of claim 4 wherein the step of directing further comprises directing the user toward a more properly pronounced speech response if the speech response segment most closely matches an improperly pronounced response.

6. The method of claim 1 wherein the step of presenting further comprises automatically representing aurally to the user each response in the subset of internal speech patterns.

7. The method of claim 1 wherein the step of presenting further comprises automatically representing visually to the user each response in the subset of internal speech patterns.

8. The method of claim 1 wherein the step of presenting further comprises representing aurally to the user a response in the subset of internal speech patterns when a signal is generated by the user.

9. The method of claim 1 wherein the step of presenting auditory or visual information further comprises encouraging the user to use perceptual skills, cognitive skills, memory skills, or motor skills to identify a correct response.

10. The method of claim 1 wherein the step of obtaining a speech response further comprises obtaining a measurement of the nasality of the speech response segment.

11. The method of claim 1 wherein the step of obtaining further comprises obtaining the spectral qualities of the speech response segment.

12. The method of claim 1 wherein the step of obtaining a speech response further comprises obtaining a measurement of the airflow from a mouth of the user during the release phase of a stop or plosive consonant in the speech response segment.

13. The method of claim 1 wherein the step of obtaining further comprises obtaining a measurement of the intonation pattern of the speech response segment.

14. A method for using a computer to teach language reading skills, according to claim 1, wherein said visual image is a string of text containing at least one word.

15. A method for using a computer to teach language reading skills, according to claim 1, wherein said visual image is a string of text containing at least one syllable.

16. A method for using a computer to teach language reading skills, according to claim 1, wherein said visual image is a string of text containing at least one phonetic image.

17. A method for using a computer to teach language reading skills, according to claim 1, wherein said visual image is a vocabulary definition of said image.

* * * * *